O. HOPPE.
MILLING MACHINE.
APPLICATION FILED JAN. 22, 1921.
1,419,853.
Patented June 13, 1922.
2 SHEETS—SHEET 1.
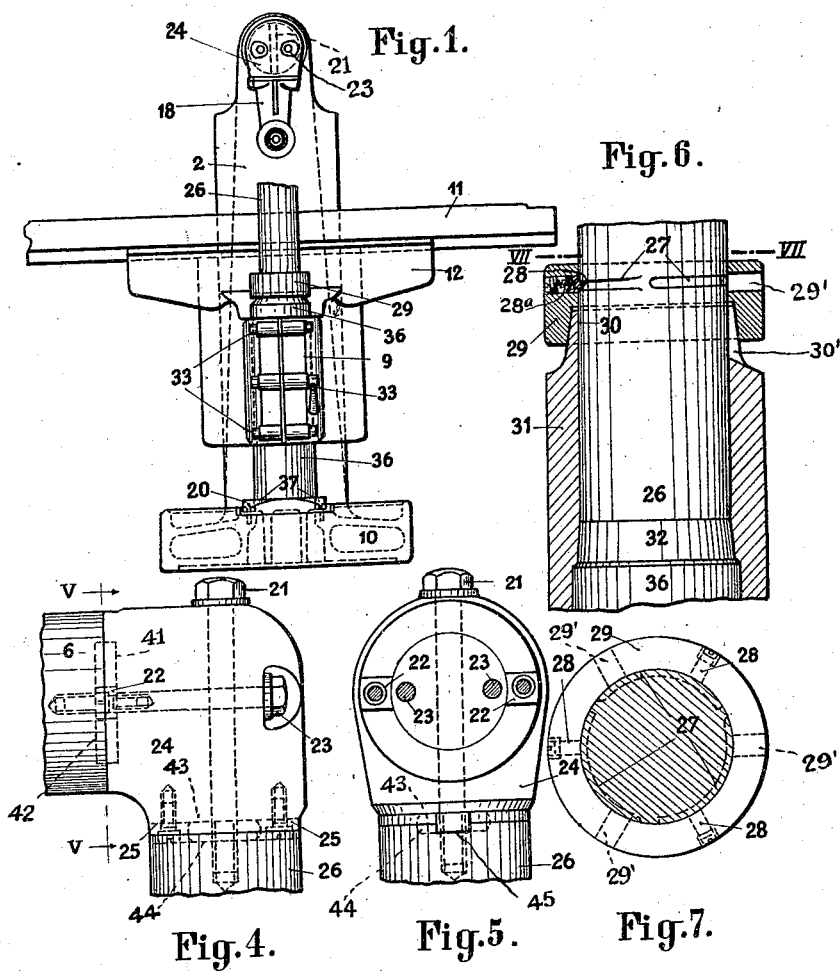
Inventor:
Oscar Hoppe

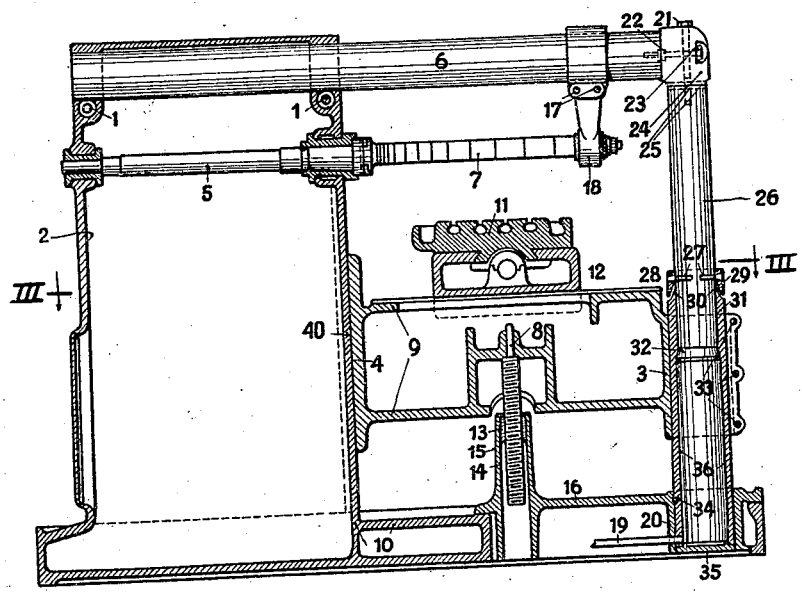

UNITED STATES PATENT OFFICE.

OSCAR HOPPE, OF RORSCHACH, SWITZERLAND, ASSIGNOR TO RICHARD A. KEMPIN, OF RORSCHACH, SWITZERLAND.

MILLING MACHINE.

1,419,853.  Specification of Letters Patent.  Patented June 13, 1922.

Application filed January 22, 1921. Serial No. 439,183.

*To all whom it may concern:*

Be it known that I, OSCAR HOPPE, a citizen of the Republic of Germany, residing at Rorschach, Kirchstrasse 52, Switzerland, have invented certain new and useful Improvements in Milling Machines (for which I have filed applications in Germany, June 6, 1916, application No. H. 70,372; Switzerland, April 4, 1918, Patent No. 79,883; France, April 9, 1918, Patent No. 489,651; Italy, April 11, 1918, Patent No. 250,480; Belgium, May 29, 1918, 273,463; and in Great Britain, April 17, 1918, Patent No. 121,070); and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in a rigid milling machine.

In milling machines of conventional design the vibrations or chatter produced by heavy and rapid cuts prevent usually taking full advantage of the capacity of the cutters. This chatter takes place for instance, in milling machines of the knee or angle table type, because the vertically movable table is gibbed only on one side of the knee to the frame of the machine, and in the Lincoln type milling machines, because the strains act only on one side of the vertically movable spindle head stock and because the spindle drive is too far away from the end of the arbor.

Rigid and stable bearings for the machine table and the cutter-arbor are the most necessary features, in order to save the cutters and obtain smooth accurate working surfaces when heavy and rapid cuts are taken to the full power of the machine and the cutters. For this purpose it has already been proposed to provide two vertical guides on two sides of the machine table and to rigidly connect these guides by means of a base plate and a connecting support.

The arrangement of such a system offers, besides a more accurate guidance, the advantage, that the vertical feeding of the machine table is done independently of this system. Compared with knee type machines, the machines having two vertical guides for the table offer the advantage, that a larger table and a wider cross feed can be used without diminishing the stability of the machine.

The purpose of the present invention is to obtain a rigid milling machine meeting all requirements of modern milling practice and offering the greatest convenience in operation.

The milling machine according to this invention is characterized by the features, that one of the two vertical guides provided for the machine table is connected to an overhanging arm by means of a movable connecting support or bar forming together with this guide a telescopic support, the arrangement being such, that after plunging the connecting bar into said guide, blanks projecting beyond this guide can be machined and that all vibrations of the machine table in any plane are avoided in consequence of the two positive vertical guides of the same.

In order to compensate for wear, the guide on the telescopic support and the nuts for the vertical feed screws are adapted to be adjusted in common as well in the longitudinal as transverse direction of the table, so that upon tightening of clamping screws any twisting of the telescopic support, overhanging arm, vertical feed screws and the table is avoided.

This invention will now be more particularly described with reference to the accompanying drawings, which illustrate a constructive example of the invention.

In these drawings:

Fig. 1 is a front view of the machine, the upper portion of the connecting bar being omitted for the sake of clearness;

Fig. 2 is a longitudinal section of the machine through the middle of the milling spindle.

Fig. 3 is a section on the line III—III of Fig. 2, the machine table and the saddle being omitted for the sake of clearness.

Fig. 4 is a side view on an enlarged scale of a locking head and the adjoining parts of the overhanging arm and telescopic support.

Fig. 5 is a view seen with regard to Fig. 4 from the left hand side of the locking head and the adjoining part of the telescopic support, illustrating some parts in a section on the line V—V of Fig. 4.

Fig. 6 is a vertical cross-section through the middle part of the telescopic support.

Fig. 7 is a section on the line VII—VII of Fig. 6.

Referring to the drawings, 2 denotes a frame or column provided with two beveled gibs 40 and a diaphragm base. The base contains a bridge 16 clamped on the same by a series of screws 37 in such a way, that it can be slightly adjusted in any direction of the horizontal plane. The bridge 16 has a hollow standard 14 which receives a nut 13 for the vertical feed screw 15. A stout sleeve 36 is mounted in a socket 20 in said bridge and is secured in position by a pin 34. The sleeve 36 forms the outer slide for a bed 9 and contains a connecting support or bar 26 adapted to plunge wholly into the sleeve 36, thus forming together with the latter a telescopic support. The vertical feed screw 15 supports the bed 9, containing a bearing 8 for the same. The bed 9 slides on its inner end 4 along the beveled gibs 40 of the column 2 and on its outer end 3 on the sleeve 36. The bed 9 can be so clamped on the slides 40 and 36 by means of screws 33 and 38 respectively, as to wholly eliminate the play required for feeding the bed 9. Thus the connection between the bed and its slides is entirely rigid and free from vibration. Due to the "positive guidance" provided on both ends, the position of the bed 9 is accurately determined for each adjustment and it is impossible to twist any part of the machine when tightening the screws 33 or 38. "Positive guidance" means that the position of a guided part outside of the required direction of movement is determined exclusively by the guides. A saddle 12 sliding on the bed 9, and a table 11 for setting up blanks and sliding on the saddle 12 are of conventional design. The bed 9, saddle 12 and table 11 form together the machine- or working-table.

The milling spindle 5 is mounted in the column 2 and coupled to the milling arbor 7 as usual in knee type milling machines. In the column 2 slides an overhanging arm 6 which can be rigidly connected to the same by means of clamping bolts 1. The arbor 7 is held by support 18 adapted to be clamped in any suitable position to the overhanging arm 6 by means of screws 17. The overhanging arm 6 can be connected to the base 10 by means of the telescopic support 26, 36. Thus the base, 10, column 2, overhanging arm 6 and telescopic support 26, 36 are like one single frame made in one piece, which with the heavy bed 9 strongly gibbed and clamped to both sides of this frame gives the greatest possible rigidity of relation between arbor 7 and table 9, 11, 12. When the connecting bar 26 is unnecessary, it is plunged entirely into the sleeve 36. To this end the connecting bar 26 must be adapted to be easily detached from and again joined to the overhanging arm 6 and also adapted to be easily and quickly brought up and down. According to the embodiment shown in the drawings, this result is obtained by a fluid under pressure inside of the sleeve 36 and supplied by a pipe 19. The sleeve 36 is closed at a bottom by a cover 35. Thus another important feature of this improved rigid milling machine consists in that the connecting bar 26 being plunged into the sleeve 36, large and encumbering pieces may be machined in maintaining fully the positive guidance on both sides of the bed 9. This guidance is also kept intact, when the table is feeding vertically.

Contrary to the braces generally used in other milling machines, the connecting bar 26 is never removed from the machine. This constitutes another great advantage of this novel machine, as it is very tiresome to carry around the braces. Also the operator will, when ever possible, work with the connecting bar 26 locked up to the overhanging arm, thus increasing considerably the capacity of the machine.

The circular section of the connecting bar 26 and the sleeve 36 combines a maximum of strength with a minimum of space, leaving the blank easy to handle and to control.

The connecting bar 26 has a sliding fit in the upper portion 31 of the sleeve 36 and must be securely fixed into the same, when in the working position. The method of holding however, illustrated on an enlarged scale in Figs. 6 and 7, ought also to be easily loosened since the connecting bar is frequently dropped into the sleeve. In order to eliminate all play after tightening, the connecting bar 26 has a tapered end 32 and the sleeve 36 also has a tapered end 30 with three slots $30^1$. Furthermore the connecting bar 26 has on its surface three grooves 27 forming a triple thread. A special nut 29 has three movable pins 28 pressed into the grooves 27 by springs $28^a$. The nut 29 also has holes $29^i$ to receive a wrench to tighten the nut. When turning the special nut to the right, the connecting bar 26 is pressed so closely against the sleeve 36 as to eliminate any play in any direction. This connection is positive, absolutely rigid and yet easily detachable.

In order to maintain the full capacity of this rigid milling machine, especially to get always the same smooth and accurate milled surfaces, when doing heavy cutting, the bed 9 must remain in a correct position to its vertical slides 4, 40 and 3, 36 which never ought to have more play than it is absolutely necessary for the feeding of the bed. Compared with other milling machines, the wear in the vertical slides 4, 40 and 3, 36 will be so considerable, due to the greater strains to which this rigid milling machine is subjected, that the slides 4, 40 and 3, 36 and the bed 9, ought to be adjusted, with regard to the column 2 for taking up wear. The bed 9 as well as the telescopic support 26, 36 and the vertical feed screw 15 simultaneously change hereby their primitive position.

That this adjustment may be done, even when the connecting bar 26 is fastened to the overhanging arm 6, said connection is made by means of a locking head 24. The latter is illustrated on an enlarged scale in Figs. 4 and 5. The adjoining end surfaces of the locking head 24 and the overhanging arm 6 have round recesses 41 and 42 respectively, and the adjoining end surfaces of the locking head 24 and the connecting bar 26 round recesses 43 and 44 respectively. Into the locking head 24 are inserted two tongues 22 and two tongues 25 (Figs. 4 and 5) adapted to produce together with the screws 23 and 21 a positive and rigid connection between the locking head 24, the overhanging arm 6 and the connecting bar 26. The two tongues 25, engaging into the slots 45 of the connecting bar 26 allow an adjustment of the telescopic support 26, 36 in a direction parallel to the axis of the milling spindle 5 after loosening the bolt 21. The two tongues 22, engaging on the other hand into two slots 46 of the overhanging arm 6, allow an adjustment in a direction diagonal to the axis of the milling spindle 5 after loosening the screws 23.

When the inner end 4 of the bed 9 and the gibs 40 become worn, wear plates 39 may be inserted between these parts as shown in Fig. 2, and the necessary adjustment of the bridge 16 to properly position the standard 14 of the screw 15 with relation to the adjusted position of the bed 9, is effected by adjusting the bed screws 37 and the bolts 21 and 23 of the locking head 24 of the telescoping support 26—36. The accurate adjustment for wear of a machine table having two slides, each of which may be accurately regulated for taking up wear, is an essential feature of the present invention.

Thus, the rigid milling machine described hereinbefore is combining the advantages of the knee type milling machine and the Lincoln type milling machine. These advantages are: rigid and stable bearings for the cutter arbor, the machine table and the spindle drive, short distance of the latter from the end of the arbor, and wide range for the cross feed. The rigid milling machine is superior to others due to special features, namely a quick and accurate vertical adjustment for the machine table, convenience in operating the connecting bar, milling of large and encumbering blanks, with the bed being positively guided on two sides, even when feeding vertically.

What I claim now as my invention is:

1. A milling machine comprising an upright, a base adjoining the latter, an overhanging arm adapted to be rigidly clamped to the upright, an outer support secured to the base and having an extension adapted to be rigidly secured to the overhanging arm thereby forming a rigid frame adapted to be opened to permit work to project over the outer support, and a work table bed adapted to slide on the upright and outer support.

2. A milling machine comprising a rigid upright, a base adjoining the latter, an overhanging arm adjustably mounted in the upright, an outer support secured to the base, a work table bed adjustably mounted on the upright and outer support, a supporting member slidably connected with the outer support, and means to detachably connect the slidable supporting member with the overhanging arm.

3. A milling machine comprising a main upright; a base adjoining the same, an overhanging arm adapted to be rigidly clamped to the main upright; an auxiliary upright adjustably secured to the base, a work table bed adapted to slide on the main upright and on the auxiliary upright, a movable brace adapted to rigidly connect the overhanging arm to the auxiliary upright whereby the main upright, overhanging arm, connecting brace, auxiliary upright and base form a solid rigid structure capable of being formed into an open frame.

4. A milling machine comprising a main upright, a base adjoining the same, an overhanging arm adapted to be rigidly clamped to the main upright, an auxiliary upright adjustably connected with the base, a work table bed guided on the main and on the auxiliary uprights, a movable connecting brace adapted to rigidly connect the overhanging arm to the auxiliary upright to assemble the main upright, overhanging arm, auxiliary upright and base into a rigid frame, said auxiliary upright adapted to be removed to form an open frame.

5. A milling machine, comprising an upright, a base adjoining the same, an overhanging arm adapted to be rigidly clamped to the upright, an outer support comprising a part rigidly connected with the base and a movable part adapted to slide along the fixed part, the outer support being adapted in its drawn out position to be rigidly bolted to the overhanging arm to assemble the upright, overhanging arm, outer support and base to form a solid and rigid frame and adapted when pushed together to allow the machine work to project over the outer support, and a work table bed guided positively on the upright and on the outer support.

6. A milling machine, comprising an upright, a base adjoining the same, an overhanging arm sliding in the upright and adapted to be rigidly clamped to the same, a telescopic support composed of a sleeve rigidly connected with the base and a plunger adapted to slide within the sleeve, the telescopic support being adapted in its extended position to be rigidly bolted to the overhanging arm in order to assemble the upright, overhanging arm, telescopic support and base into a solid and rigid frame and adapted when pushed together to allow the machine work to project over the telescopic support, a work table bed adapted to slide on the upright and on said sleeve, means carried by the base for supporting said bed, and means for adjusting the telescopic support and the supporting means for the bed with regard to the upright in the longitudinal and transverse directions of said bed.

7. A milling machine, comprising an upright, a base adjoining the same, a bridge secured to the base, an overhanging arm sliding in the upright and adapted to be rigidly clamped to the same, a telescopic support composed of a sleeve attached to the bridge and a plunger adapted to be moved within the sleeve, the telescopic support being adapted in its extended position to produce together with the bridge a rigid connection between the overhanging arm and the base; a bed adapted to slide on the upright and on said sleeve, a saddle arranged to slide on the bed, a table for setting up work arranged to slide in a cross direction on the saddle, a vertical feed screw supporting the bed, a nut for the vertical feed screw held in the bridge, and means for adjusting conjointly the telescopic support and the nut for the vertical feed screw with regard to the upright in the longitudinal and transverse direction of the bed.

In testimony that I claim the foregoing as my invention, I have signed my name.

OSCAR HOPPE.